(12) United States Patent
Shukunami

(10) Patent No.: US 8,983,298 B2
(45) Date of Patent: Mar. 17, 2015

(54) OPTICAL CHANNEL MONITOR

(71) Applicant: Fujitsu Limited, Kawasaki-shi, Kanagawa (JP)

(72) Inventor: Norifumi Shukunami, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 175 days.

(21) Appl. No.: 13/764,055

(22) Filed: Feb. 11, 2013

(65) Prior Publication Data

US 2013/0243424 A1    Sep. 19, 2013

(30) Foreign Application Priority Data

Mar. 19, 2012  (JP) ................. 2012-061886

(51) Int. Cl.
*H04B 10/00* (2013.01)
*H04J 14/02* (2006.01)
*H04B 10/079* (2013.01)

(52) U.S. Cl.
CPC ......... *H04J 14/0201* (2013.01); *H04J 14/0227* (2013.01); *H04B 10/07955* (2013.01); *H04B 10/07957* (2013.01)
USPC ................................................ 398/83; 398/9

(58) Field of Classification Search
CPC .................................................. H04B 10/0731
USPC ...................................................... 398/9, 83
See application file for complete search history.

(56) References Cited

U.S. PATENT DOCUMENTS

| 6,204,959 | B1 | 3/2001 | Fujita et al. | |
| 2002/0028039 | A1* | 3/2002 | Lee et al. | 385/24 |
| 2006/0239684 | A1 | 10/2006 | Oguma | |
| 2010/0073763 | A1* | 3/2010 | Chen et al. | 359/337.2 |

FOREIGN PATENT DOCUMENTS

| JP | 10-173266 | 6/1998 |
| JP | 2006-310963 | 11/2006 |

* cited by examiner

*Primary Examiner* — Danny Leung
(74) *Attorney, Agent, or Firm* — Staas & Halsey LLP

(57) ABSTRACT

An optical channel monitor includes: a first optical device to include first, second and third optical ports, light input through the first optical port being led to the second optical port, light input through the second optical port being led at least to the third optical port; a second optical device to include fourth, fifth and sixth optical ports, light input through the fourth optical port being led to the fifth optical port, light input through the fifth optical port being led at least to the sixth optical port; an optical filter to include seventh and eighth optical ports optically connected to the second and fifth optical ports, respectively, a specified wavelength being transmitted between the seventh and eighth optical ports; a first photo detector to detect light output from the sixth optical port; and a second photo detector to detect light output from the third optical port.

8 Claims, 13 Drawing Sheets

US 8,983,298 B2

OPTICAL CHANNEL MONITOR

CROSS-REFERENCE TO RELATED APPLICATION

This application is based upon and claims the benefit of priority of the prior Japanese Patent Application No. 2012-061886, filed on Mar. 19, 2012, the entire contents of which are incorporated herein by reference.

FIELD

The embodiments discussed herein are related to an optical channel monitor that monitors each channel of a WDM signal.

BACKGROUND

Wavelength division multiplexing (WDM) is put into practical use as one of technologies to realize bulk data transmission in optical communication systems. Multiple channels having different wavelengths are provided in the WDM. In other words, multiple optical signals having different wavelengths are multiplexed in a WDM signal.

Optical add-drop multiplexing (OADM) apparatuses are provided in nodes of WDM transmission systems that transmit WDM signals. The optical add-drop multiplexing apparatuses are capable of splitting optical signals having specified wavelengths from the WDM signals to lead the optical signals to clients. In addition, the optical add-drop multiplexing apparatuses are capable of inserting client signals having arbitrary wavelengths into the WDM signals. Furthermore, many optical add-drop multiplexing apparatuses include optical channel monitors (OCMs) for monitoring wavelength channels of the WDM signals.

FIG. 1 illustrates an example of the configuration of optical add-drop multiplexing apparatuses each including optical channel monitors. Two optical add-drop multiplexing apparatuses 100A and 100B provided on optical transmission lines are illustrated in FIG. 1. The optical add-drop multiplexing apparatuses 100A and 100B are hereinafter collectively referred to as an optical add-drop multiplexing apparatus 100.

The optical add-drop multiplexing apparatus 100 includes an OADM device 101, an optical beam splitter (BS) 102, an optical amplifier 103, an optical multiplexer 104, an optical channel monitor (OCM) 105, a controller 106, an optical demultiplexer 107, an optical amplifier 108, an optical beam splitter (BS) 109, an optical channel monitor (OCM) 110, a controller 111, a monitoring signal transmitter 112, and a monitoring signal receiver 113. The configuration and the operation of the optical add-drop multiplexing apparatus 100A are substantially the same as those of the optical add-drop multiplexing apparatus 100B. The operation of the optical add-drop multiplexing apparatus 100A will now be described.

The OADM device 101 may insert a client signal into a WDM signal. In addition, the OADM device 101 adjusts the power of each channel of the WDM signal in accordance with an instruction from the controller 106. The OADM device 101 includes a wavelength selective switch (WSS).

The optical beam splitter 102 splits the WDM signal supplied from the OADM device 101 to lead the WDM signal to the optical amplifier 103 and the optical channel monitor 105. The WDM signal output from the OADM device 101 in the optical add-drop multiplexing apparatus 100A is transmitted to the optical add-drop multiplexing apparatus 100B.

The optical channel monitor 105 monitors the power of each channel of the WDM signal supplied from the OADM device 101. The optical amplifier 103 amplifies the WDM signal supplied from the OADM device 101. The optical multiplexer 104 multiplexes a monitoring signal supplied from the monitoring signal transmitter 112 on the WDM signal amplified by the optical amplifier 103.

Accordingly, the WDM signal and the monitoring signal are transmitted from the optical add-drop multiplexing apparatus 100A to the optical add-drop multiplexing apparatus 100B through an optical transmission line 120A. Similarly, the WDM signal and the monitoring signal are transmitted from the optical add-drop multiplexing apparatus 100B to the optical add-drop multiplexing apparatus 100A through an optical transmission line 120B.

The optical add-drop multiplexing apparatus 100A receives the WDM signal and the monitoring signal transmitted from the optical add-drop multiplexing apparatus 100B. The optical demultiplexer 107 in the optical add-drop multiplexing apparatus 100A leads the WDM signal that is demultiplexed to the optical amplifier 108 and leads the monitoring signal that is demultiplexed to the monitoring signal receiver 113. The optical amplifier 108 amplifies the WDM signal. The optical beam splitter 109 splits the WDM signal amplified by the optical amplifier 108 to lead the WDM signal to the optical channel monitor 110. An optical splitter 115 splits the WDM signal output from the optical beam splitter 109. A specified wavelength is selected from the WDM signal that is split and the WDM signal having the selected wavelength is transmitted to a client.

The optical channel monitor 110 monitors the power of each channel of the WDM signal received from the optical add-drop multiplexing apparatus 100B. The controller 111 generates a monitoring signal including control information to be transmitted to the optical add-drop multiplexing apparatus 100B on the basis of the result of the monitoring by the optical channel monitor 110. The monitoring signal transmitter 112 leads the monitoring signal generated by the controller 111 to the optical multiplexer 104.

The monitoring signal receiver 113 in the optical add-drop multiplexing apparatus 100A receives a monitoring signal transmitted from the optical add-drop multiplexing apparatus 100B. The controller 106 controls the OADM device 101 on the basis of the result of the monitoring by the optical channel monitor 105 and the monitoring signal received from the optical add-drop multiplexing apparatus 100B. Specifically, the controller 106 controls the OADM device 101 so as to compensate or suppress the power deviation between the channels of the WDM signal.

As described above, the optical add-drop multiplexing apparatus 100A adjusts the power of each channel of the WDM signal to be transmitted to the optical add-drop multiplexing apparatus 100B on the basis of the power of each channel of the WDM signal to be transmitted to the optical add-drop multiplexing apparatus 100B and the monitoring signal received from the optical add-drop multiplexing apparatus 100B. In addition, the optical add-drop multiplexing apparatus 100A monitors the power of each channel of the WDM signal received from the optical add-drop multiplexing apparatus 100B and notifies the optical add-drop multiplexing apparatus 100B of the result of the monitoring by using the monitoring signal.

Signal light monitors that monitor the power of each signal light of wavelength division multiplexing signal light are proposed as a related technology. Such a signal light monitor includes an optical splitter provided on an optical fiber transmission line; a wavelength tunable filter that transmits a light component having a specified wavelength included in the light split by the optical splitter; a sweeper that sweeps the wavelength transmitted through the wavelength tunable filter in a specified wavelength region; a photo detector that receives the light transmitted through the wavelength tunable filter; a sampling unit that samples the output from the photo detector; a storage unit that stores the variation in time in the sampling unit; and an arithmetic processor that performs arithmetic processing to the wavelength output from the photo detector on the basis of data stored in the storage unit. For example, such a technology is disclosed in Japanese Laid-open Patent Publication No. 10-173266. An optical multiplexer/demultiplexer described in Japanese Laid-open Patent Publication No. 2006-310963 is known as another related technology.

SUMMARY

According to an aspect of the invention, an optical channel monitor includes: a first optical device configured to include a first optical port, a second optical port, and a third optical port, light input through the first optical port being led to the second optical port, light input through the second optical port being led at least to the third optical port; a second optical device configured to include a fourth optical port, a fifth optical port, and a sixth optical port, light input through the fourth optical port being led to the fifth optical port, light input through the fifth optical port being led at least to the sixth optical port; an optical filter configured to include a seventh optical port optically connected to the second optical port of the first optical device and an eighth optical port optically connected to the fifth optical port of the second optical device, a specified wavelength being transmitted between the seventh optical port and the eighth optical port; a first photo detector configured to detect light output from the sixth optical port of the second optical device; and a second photo detector configured to detect light output from the third optical port of the first optical device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
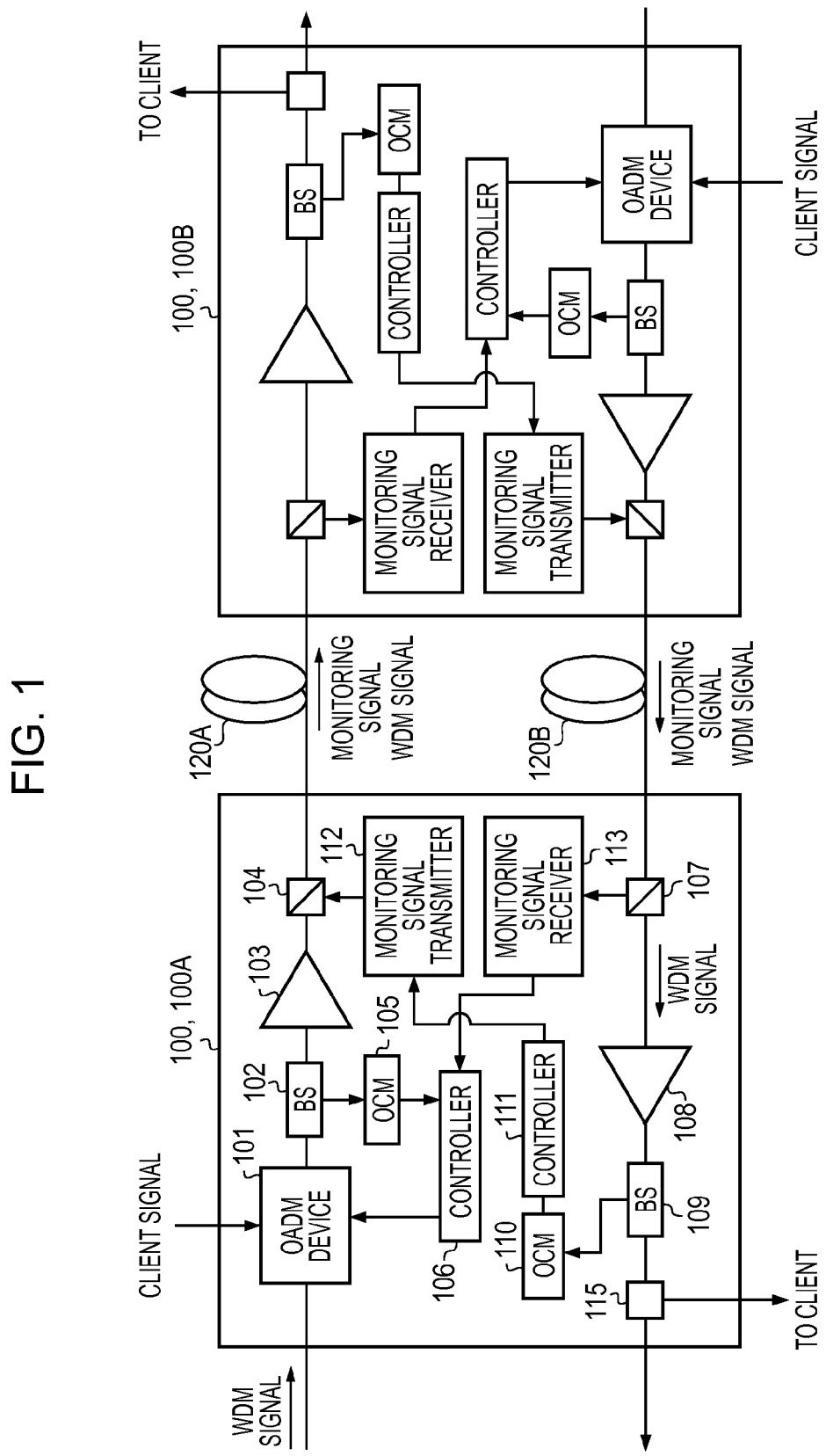
FIG. 1 illustrates an example of the configuration of optical add-drop multiplexing apparatuses each including optical channel monitors in related art.

The optical add-drop multiplexing apparatus 100 illustrated in FIG. 1 includes the two optical channel monitors. For example, the optical add-drop multiplexing apparatus 100A includes the optical channel monitor 105 that monitors the power of each channel of the WDM signal to be transmitted to the optical add-drop multiplexing apparatus 100B and the optical channel monitor 110 that monitors the power of each channel of the WDM signal received from the optical add-drop multiplexing apparatus 100B.

Figure 2:
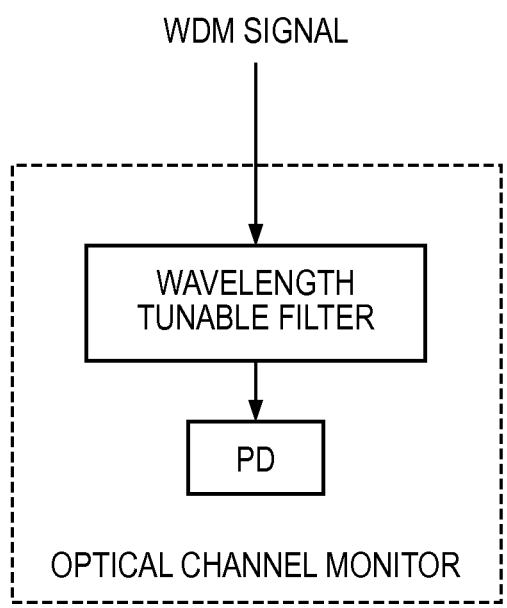
FIG. 2 illustrates an example of the configuration of the optical channel monitor.

For example, the optical channel monitor includes a wavelength tunable filter and a photo detector (PD), as illustrated in FIG. 2. In this case, the wavelength tunable filter is controlled so as to transmit the wavelength of a channel on which the optical power is to be detected. Accordingly, sweeping the wavelength transmitted through the wavelength tunable filter allows the power of each channel of the WDM signal to be monitored.

However, the wavelength tunable filter that is capable of precisely controlling the transmitted wavelength is expensive. Accordingly, when an optical transmission apparatus (for example, the optical add-drop multiplexing apparatus 100 illustrated in FIG. 1) includes multiple optical channel monitors, the optical transmission apparatus is increased in cost. In other words, the cost of the optical transmission apparatus is increased when the optical transmission apparatus has a function or a circuit to monitor multiple WDM signals.

An optical channel monitor capable of reducing the cost of a device or a circuit to monitor multiple WDM signals will be described below.

Figure 3:
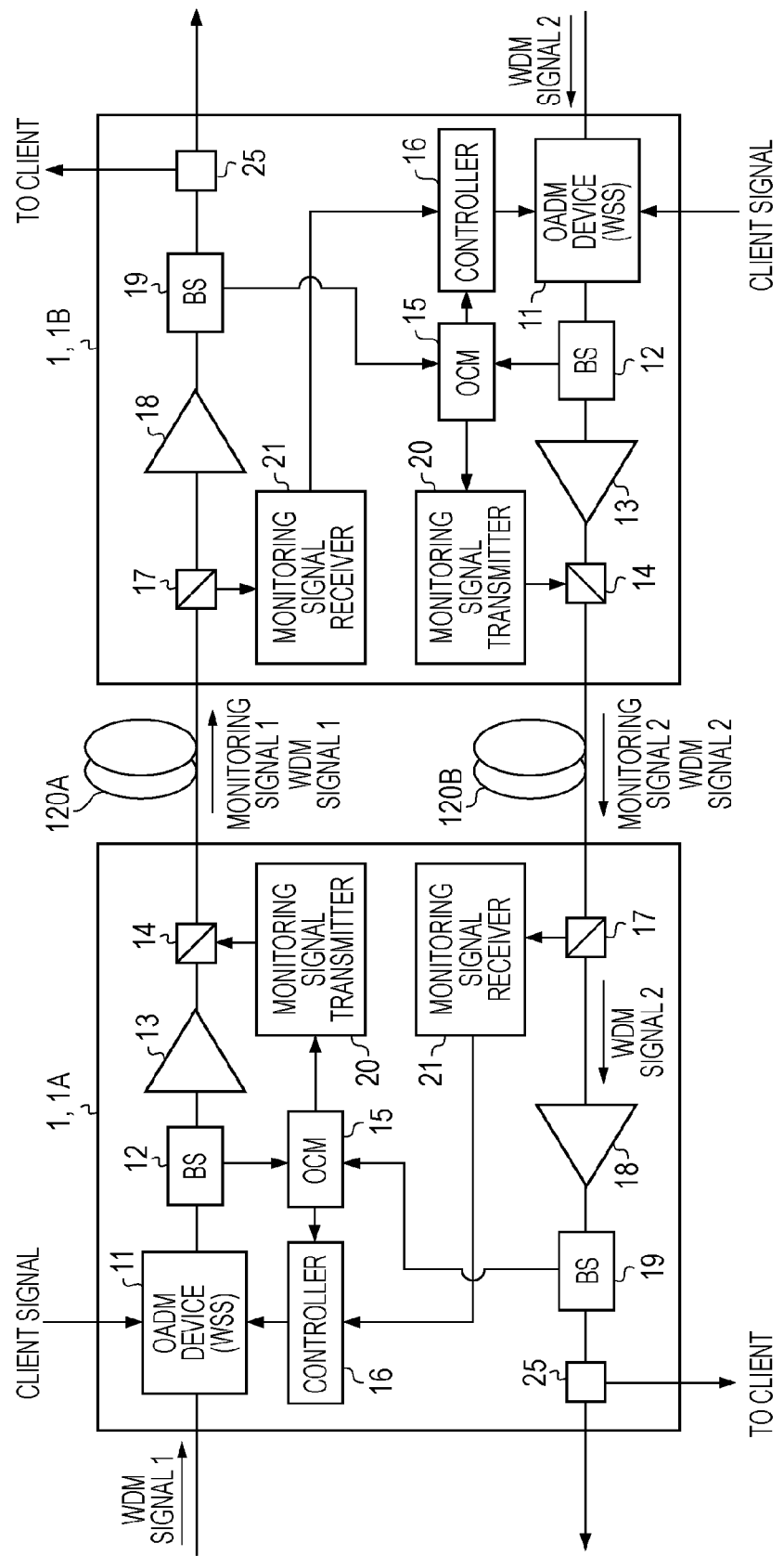
FIG. 3 illustrates an example of the configuration of optical transmission apparatuses each including an optical channel monitor according to an embodiment.

FIG. 3 illustrates an example of the configuration of optical transmission apparatuses each including an optical channel monitor according to an embodiment. Two optical add-drop multiplexing apparatuses 1A and 1B provided on optical transmission lines are illustrated in FIG. 3. The optical add-drop multiplexing apparatuses 1A and 1B are hereinafter collectively referred to as an optical add-drop multiplexing apparatus 1. The optical add-drop multiplexing apparatus is an example of the optical transmission apparatus including the optical channel monitor.

The optical add-drop multiplexing apparatus 1 includes an OADM device 11, an optical beam splitter (BS) 12, an optical amplifier 13, an optical multiplexer 14, an optical channel monitor (OCM) 15, a controller 16, an optical demultiplexer 17, an optical amplifier 18, an optical beam splitter (BS) 19, a monitoring signal transmitter 20, and a monitoring signal receiver 21. The configuration and the operation of the optical add-drop multiplexing apparatus 1A are substantially the same as those of the optical add-drop multiplexing apparatus 1B. The operation of the optical add-drop multiplexing apparatus 1A will now be described.

The OADM device 11 may insert a client signal into a WDM signal (here, a WDM signal 1). In addition, the OADM device 11 adjusts the power of each channel of the WDM signal 1 in accordance with an instruction from the controller 16. The OADM device 11 includes a wavelength selective switch (WSS).

The optical beam splitter 12 splits the WDM signal 1 supplied from the OADM device 11 to lead the WDM signal 1 to the optical amplifier 13 and the optical channel monitor 15. The WDM signal 1 output from the OADM device 11 in the optical add-drop multiplexing apparatus 1A is transmitted to the optical add-drop multiplexing apparatus 1B through an optical transmission line 120A.

The optical channel monitor 15 monitors the power of each channel of the WDM signal 1 supplied from the OADM device 11. In addition, the optical channel monitor 15 monitors the power of each channel of a WDM signal 2 received from the optical add-drop multiplexing apparatus 1B. The optical channel monitor 15 simultaneously monitors the power of each channel of the WDM signal 1 and the power of each channel of the WDM signal 2, as described in detail below.

The optical amplifier 13 amplifies the WDM signal 1 supplied from the OADM device 11. The optical multiplexer 14 multiplexes a monitoring signal 1 supplied from the monitoring signal transmitter 20 on the WDM signal 1 amplified by the optical amplifier 13. Accordingly, the WDM signal 1 and the monitoring signal 1 are transmitted from the optical add-drop multiplexing apparatus 1A to the optical add-drop multiplexing apparatus 1B through the optical transmission line 120A. Similarly, the WDM signal 2 and a monitoring signal 2 are transmitted from the optical add-drop multiplexing apparatus 1B to the optical add-drop multiplexing apparatus 1A through an optical transmission line 120B.

The optical add-drop multiplexing apparatus 1A receives the WDM signal 2 and the monitoring signal 2 transmitted from the optical add-drop multiplexing apparatus 1B. The optical demultiplexer 17 in the optical add-drop multiplexing apparatus 1A leads the WDM signal 2 to the optical amplifier 18 and leads the monitoring signal 2 to the monitoring signal receiver 21. The optical amplifier 18 amplifies the WDM signal 2. The optical beam splitter 19 splits the WDM signal 2 amplified by the optical amplifier 18 to lead the WDM signal 2 to the optical channel monitor 15. An optical splitter 25 splits the WDM signal output from the optical beam splitter 19 (that is, the WDM signal 2). A specified wavelength is selected from the WDM signal that is split and the WDM signal having the selected wavelength is transmitted to a client.

The monitoring signal transmitter 20 generates the monitoring signal 1 to be transmitted to the optical add-drop multiplexing apparatus 1B on the basis of the result of the monitoring by the optical channel monitor 15. The monitoring signal 1 includes information indicating the power of each channel of the WDM signal 2. The monitoring signal 1 is realized by an optical signal having a wavelength different from that of the WDM signal 1. The monitoring signal 1 generated by the monitoring signal transmitter 20 is multiplexed on the WDM signal 1 by the optical multiplexer 14. The monitoring signal receiver 21 in the optical add-drop multiplexing apparatus 1A receives the monitoring signal 2 transmitted from the optical add-drop multiplexing apparatus 1B.

The controller 16 controls the OADM device 11 on the basis of the result of the monitoring of the WDM signal 1 by the optical channel monitor 15 and the monitoring signal 2 received from the optical add-drop multiplexing apparatus 1B. Specifically, the controller 16 controls the OADM device 11, for example, so as to compensate or suppress the power deviation between the channels of the WDM signal 1.

As described above, the optical add-drop multiplexing apparatus 1A adjusts the power of each channel of the WDM signal 1 to be transmitted to the optical add-drop multiplexing apparatus 1B on the basis of the power of each channel of the WDM signal 1 to be transmitted to the optical add-drop multiplexing apparatus 1B and the monitoring signal 2 received from the optical add-drop multiplexing apparatus 1B. In addition, the optical add-drop multiplexing apparatus 1A monitors the power of each channel of the WDM signal 2 received from the optical add-drop multiplexing apparatus 1B to notify the optical add-drop multiplexing apparatus 1B of the result of the monitoring by using the monitoring signal 1.

The configuration and the operation of the optical add-drop multiplexing apparatus 1B are substantially the same as those of the optical add-drop multiplexing apparatus 1A. Specifically, the optical add-drop multiplexing apparatus 1B adjusts the power of each channel of the WDM signal 2 to be transmitted to the optical add-drop multiplexing apparatus 1A on the basis of the power of each channel of the WDM signal 2 to be transmitted to the optical add-drop multiplexing apparatus 1A and the monitoring signal 1 received from the optical add-drop multiplexing apparatus 1A. In addition, the optical add-drop multiplexing apparatus 1B monitors the power of each channel of the WDM signal 1 received from the optical add-drop multiplexing apparatus 1A to notify the optical add-drop multiplexing apparatus 1A of the result of the monitoring by using the monitoring signal 2.

Figure 4:
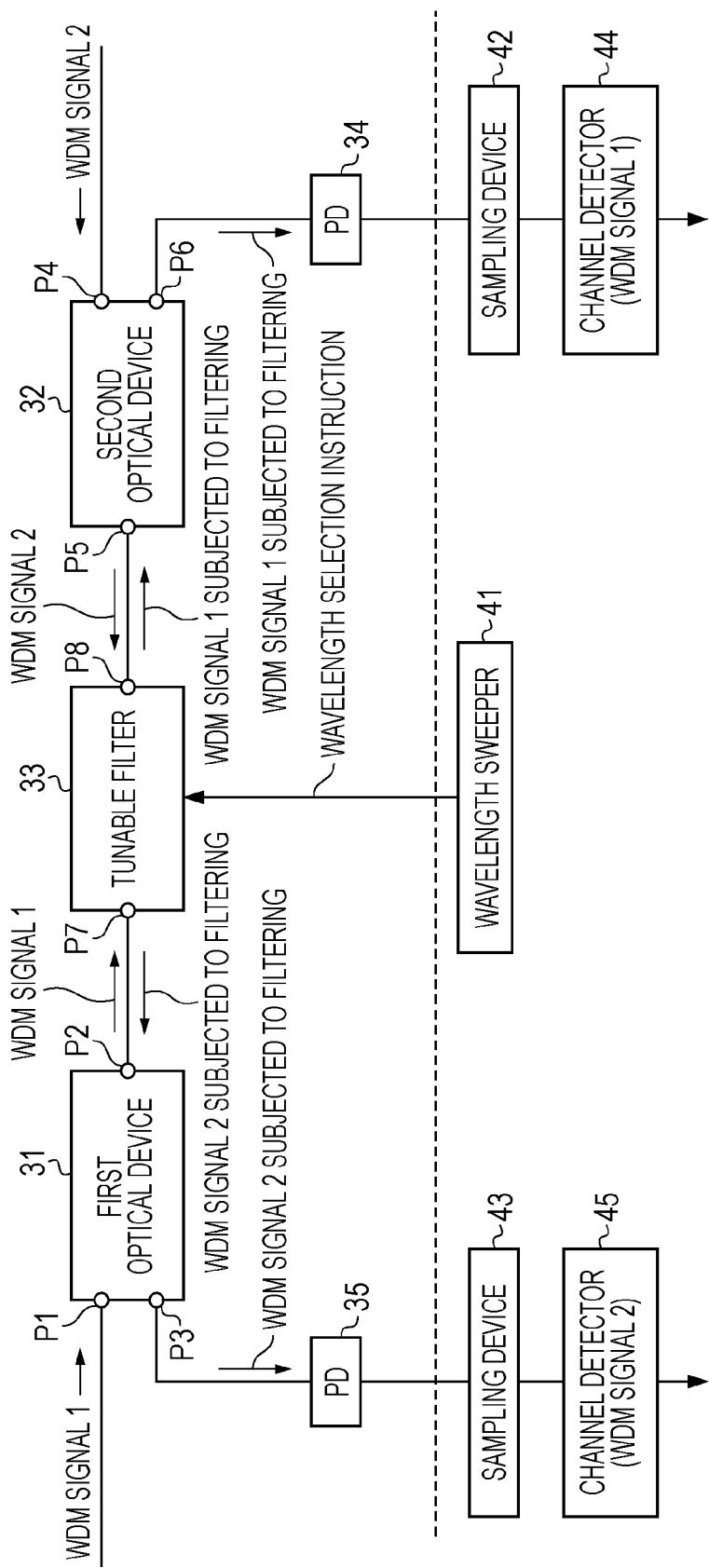
FIG. 4 illustrates an example of the configuration of the optical channel monitor according to the embodiment.

FIG. 4 illustrates an example of the configuration of the optical channel monitor according to the embodiment. Referring to FIG. 4, the optical channel monitor 15 includes a first optical device 31, a second optical device 32, a tunable filter 33, and photo detectors 34 and 35. The optical channel monitor 15 is mounted in the optical add-drop multiplexing apparatus 1 in the example illustrated in FIG. 3.

The optical channel monitor 15 simultaneously monitors the power of each channel of the two WDM signals. It is assumed in the following description that the optical channel monitor 15 monitors the power of each channel of the WDM signal 1 and the power of each channel of the WDM signal 2. In other words, the WDM signal 1 and the WDM signal 2 are input into the optical channel monitor 15.

The first optical device 31 has an optical port P1, an optical port P2, and an optical port P3. The first optical device 31 leads light input through the optical port P1 to the optical port P2 and leads light input through the optical port P2 at least to the optical port P3.

The second optical device 32 has an optical port P4, an optical port P5, and an optical port P6. The second optical device 32 leads light input through the optical port P4 to the optical port P5 and leads light input through the optical port P5 at least to the optical port P6.

The tunable filter 33 has an optical port P7 and an optical port P8. The optical port P7 is optically connected to the optical port P2 of the first optical device 31. The optical port P8 is optically connected to the optical port P5 of the second optical device 32. The tunable filter 33 transmits a specified wavelength between the optical port P7 and the optical port P8. The tunable filter 33 does not have directivity. Accordingly, the tunable filter 33 transmits light of the specified wavelength from the optical port P7 to the optical port P8 and transmits light of the specified wavelength from the optical port P8 to the optical port P7.

The configuration of the respective optical ports P1 to P8 and the method of mounting them are not specifically restricted. In other words, each optical port may be realized in an arbitrary configuration and by an arbitrary method allowing input and output of light.

The photo detector 34 detects light output from the optical port P6 of the second optical device 32. The photo detector 35 detects light output from the optical port P3 of the first optical device 31.

The WDM signal 1 is input into the optical port P1 of the first optical device 31. Then, the WDM signal 1 is output from the optical port P2 and is led to the optical port P7 of the tunable filter 33. The tunable filter 33 transmits a wavelength component specified by an instruction to select a wavelength (wavelength selection instruction). A transmitted wavelength specified by the wavelength selection instruction is called λs. In this case, the tunable filter 33 extracts a λs component from the WDM signal 1 and outputs the extracted λs component through the optical port P8.

The λs component of the WDM signal 1 output from the optical port P8 of the tunable filter 33 is led to the optical port P5 of the second optical device 32. Then, the λs component of the WDM signal 1 is output from the optical port P6. Accordingly, the photo detector 34 detects the λs component of the WDM signal 1. Specifically, the photo detector 34 generates current corresponding to the λs component of the WDM signal 1.

The WDM signal 2 is input into the optical port P4 of the second optical device 32. Then, the WDM signal 2 is output from the optical port P5 and is led to the optical port P8 of the tunable filter 33. The tunable filter 33 extracts a λs component from the WDM signal 2 and outputs the extracted λs component through the optical port P7.

The λs component of the WDM signal 2 output from the optical port P7 of the tunable filter 33 is led to the optical port P2 of the first optical device 31. Then, the λs component of the WDM signal 2 is output from the optical port P3. Accordingly, the photo detector 35 detects the λs component of the WDM signal 2. Specifically, the photo detector 35 generates current corresponding to the λs component of the WDM signal 2.

Figure 5:
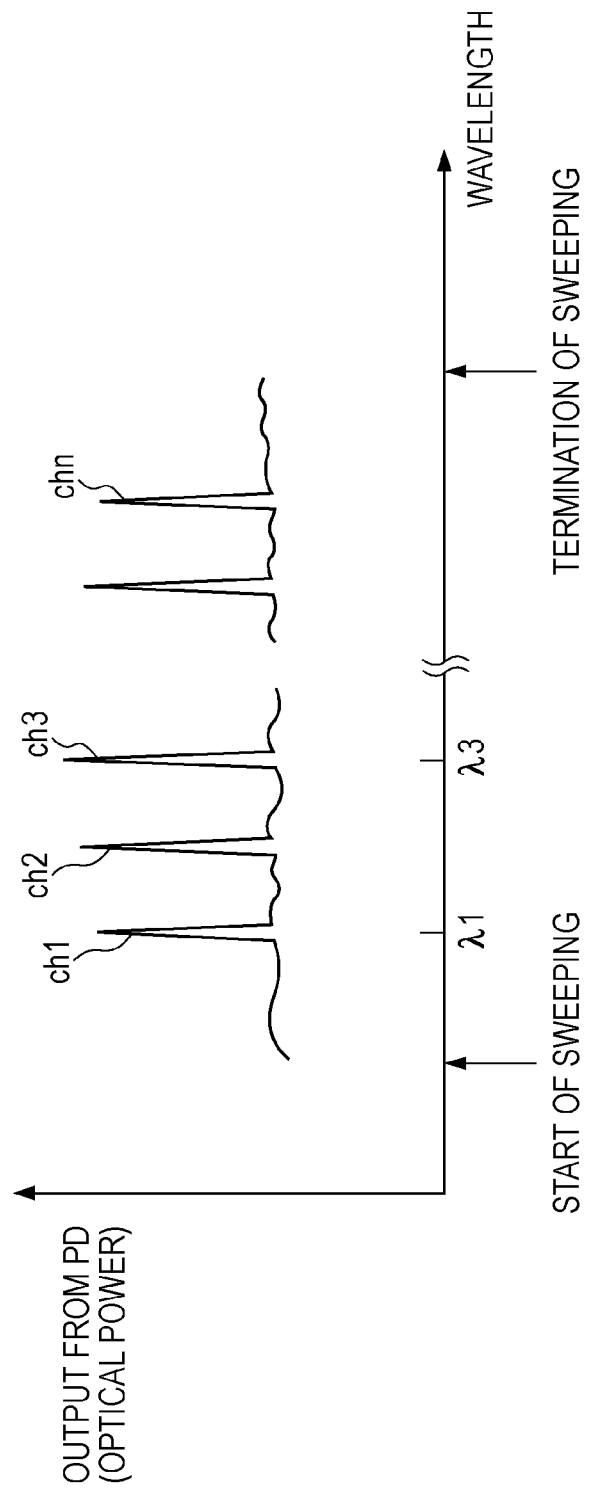
FIG. 5 is a diagram for describing how to monitor channels of a WDM signal.

A wavelength sweeper 41 instructs the tunable filter 33 to select a wavelength so that the transmitted wavelength λs of the tunable filter 33 is swept over the wavelength range of the WDM signal. For example, as illustrated in FIG. 5, it is assumed that the WDM signal includes waveform channels ch 1 to ch n. In this case, the wavelength sweeper 41 instructs the tunable filter 33 to select a wavelength so that the transmitted wavelength λs is swept over all the waveform channels ch 1 to ch n. Although the transmitted wavelength λs is swept from a short wavelength side to a long wavelength side in the example illustrated in FIG. 5, the transmitted wavelength λs may be swept from the long wavelength side to the short wavelength side.

When the transmitted wavelength λs of the tunable filter 33 is swept in response to the wavelength selection instruction, the signals output from the photo detectors 34 and 35 are varied with the transmitted wavelength λs. For example, in the example illustrated in FIG. 5, when the transmitted wavelength λs=λ1, current corresponding to the optical signal on the waveform channel ch 1 is generated by the photo detector. When the transmitted wavelength λs=λ3, current corresponding to the optical signal on the waveform channel ch 3 is generated by the photo detector.

A sampling device 42 samples the signal output from the photo detector 34. Similarly, a sampling device 43 samples the signal output from the photo detector 35. A device that converts a current signal into a voltage signal (for example, a trans-impedance amplifier (TIA)) may be provided between the photo detector 34 and the sampling device 42 and between the photo detector 35 and the sampling device 43. The sampling devices 42 and 43 are each realized by, for example, an analog-to-digital (A/D) converter.

A channel detector 44 detects the powers of multiple channels of the WDM signal 1 on the basis of the signal output from the sampling device 42. Similarly, a channel detector 45 detects the powers of multiple channels of the WDM signal 2 on the basis of the signal output from the sampling device 43. The channel detectors 44 and 45 may detect the power of each channel in synchronization with a waveform selection signal generated by the wavelength sweeper 41.

As described above, upon sweeping of the transmitted wavelength λs of the tunable filter 33, the power of each channel of the WDM signal 1 is detected by the channel detector 44 and the power of each channel of the WDM signal 2 is detected by the channel detector 45. In other words, the optical channel monitor 15 of the present embodiment is capable of simultaneously monitoring the respective channels of the two WDM signals with one tunable filter.

The wavelength sweeper 41 and the channel detectors 44 and 45 are each realized by, for example, a digital signal processor (DSP). In this case, the sampling devices 42 and 43 may be included in the digital signal processors or may be provided outside the digital signal processors. The wavelength sweeper 41, the sampling devices 42 and 43, and the channel detectors 44 and 45 may be part of the optical channel monitor 15. Alternatively, the wavelength sweeper 41, the sampling devices 42 and 43, and the channel detectors 44 and 45 may be provided outside the optical channel monitor 15.

Although the tunable filter 33 is not specifically restricted, the tunable filter 33 is realized by, for example, an acoustic-optic tunable filter (AOTF). In this case, the control signal (that is, the wavelength selection instruction) for specifying the transmitted wavelength of the tunable filter 33 is an acoustic wave signal (for example, a surface acoustic wave (SAW)) having a frequency corresponding to the transmitted wavelength. Accordingly, the wavelength sweeper 41 may control the frequency of the acoustic wave signal to sweep the transmitted wavelength of the tunable filter 33.

The tunable filter 33 may be realized by using another device. For example, the tunable filter 33 may be realized by a thin film filter. Alternatively, the tunable filter 33 may be realized by an optical filter the transmitted wavelength of which is varied with the temperature. In this case, the transmitted wavelength is controlled with, for example, current to be supplied to a heater provided near the optical filter. Alternatively, the tunable filter 33 may be realized by an optical device that disperses input light. In this case, the angle of the optical device is controlled so that the light of a desired wavelength is led to the corresponding optical port. Such an optical device is realized by, for example, a dielectric multi-layer film.

Exemplary examples of the optical channel monitor 15 will now be described with reference to FIG. 6 to FIG. 9. The wavelength sweeper 41, the sampling devices 42 and 43, and the channel detectors 44 and 45 illustrated in FIG. 4 are omitted in FIG. 6 to FIG. 9.

Figure 6:
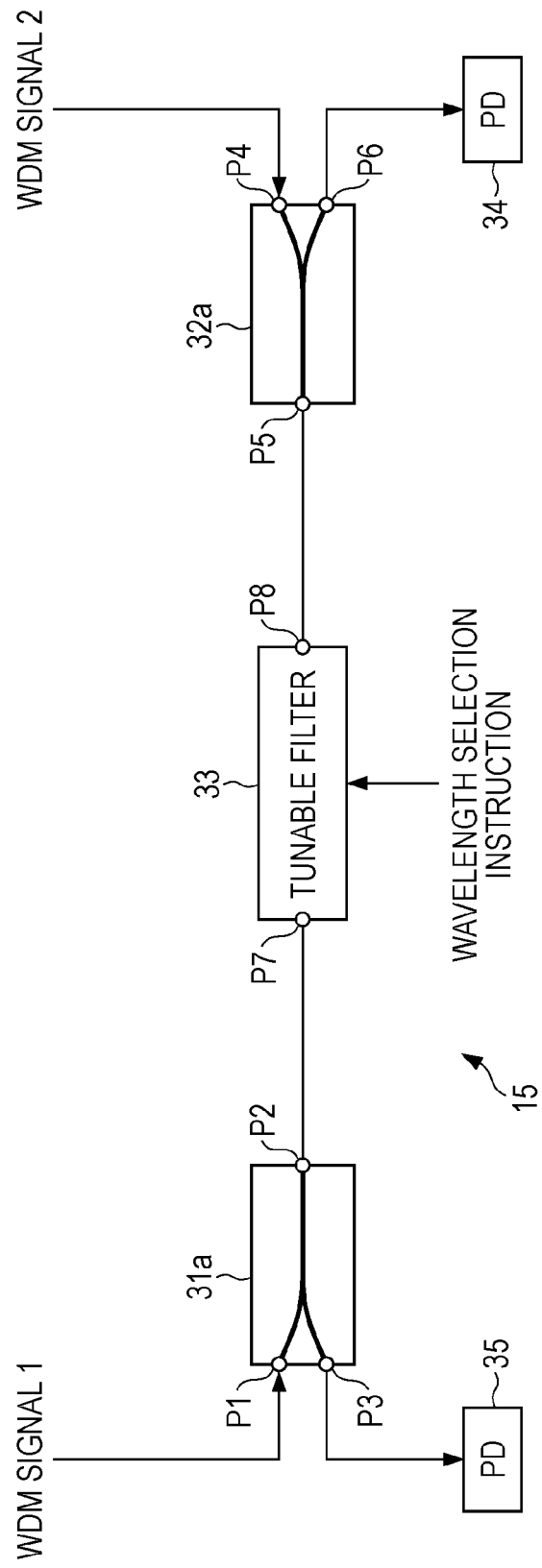
FIG. 6 illustrates a first example of the optical channel monitor.

In the example illustrated in FIG. 6, the first optical device 31 and the second optical device 32 are each realized by an optical coupler. Specifically, an optical coupler 31a is an example of the first optical device 31 and an optical coupler 32a is an example of the second optical device 32.

The optical coupler 31a is configured so that light input through the optical port P1 is led to the optical port P2, light input through the optical port P2 is led to the optical port P1 and the optical port P3, and light input through the optical port P3 is led to the optical port P2. Similarly, the optical coupler 32a is configured so that light input through the optical port P4 is led to the optical port P5, light input through the optical port P5 is led to the optical port P4 and the optical port P6, and light input through the optical port P6 is led to the optical port P5.

The optical couplers 31a and 32a are, for example, waveguide optical couplers or optical fiber couplers. The optical couplers 31a and 32a may be, for example, 2×1 optical couplers. However, the optical couplers 31a and 32a are not limited to the 2×1 optical couplers and may be realized by m×n optical couplers (m and n are arbitrary integers). In this case, in the optical coupler 31a, two optical ports, among the m-number optical ports, are used as the optical ports P1 and P3 and one optical port, among the n-number optical ports, is used as the optical port P2. Similarly, in the optical coupler 32a, two optical ports, among the m-number optical ports, are used as the optical ports P4 and P6 and one optical port, among the n-number optical ports, is used as the optical port P5.

As described above, the use of the optical coupler 31a and the optical coupler 32a as the first optical device 31 and the second optical device 32, respectively, allows the channel monitoring operation described above with reference to FIG. 4 and FIG. 5 to be realized. However, in the configuration illustrated in FIG. 6, the wavelength component of the WDM signal 1 passing through the tunable filter 33 is led to not only the optical port P6 but also the optical port P4. This wavelength component may have an effect on a circuit optically connected to the optical port P4. Similarly, the wavelength component of the WDM signal 2 passing through the tunable filter 33 is led to not only the optical port P3 but also the optical port P1. This wavelength component may have an effect on a circuit optically connected to the optical port P1.

Accordingly, the optical channel monitor 15 preferably has a function to remove or suppress the effect on the circuits optically connected to the optical ports P1 and P4. This function is realized by, for example, configurations illustrated in FIG. 7 to FIG. 9.

Figure 7:
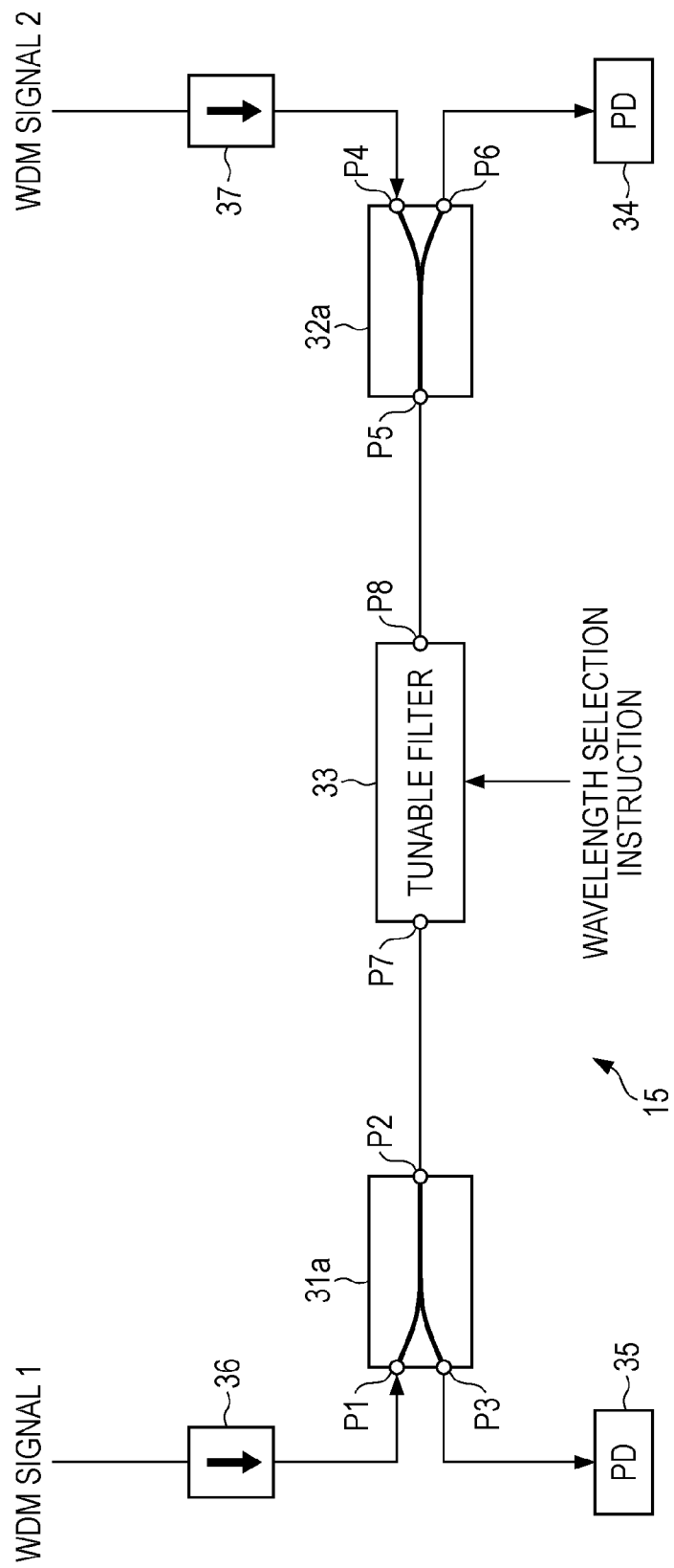
FIG. 7 illustrates a second example of the optical channel monitor.

In the example illustrated in FIG. 7, the optical channel monitor 15 includes an optical isolator 36 and an optical isolator 37, in addition to the optical couplers 31a and 32a, the tunable filter 33, and the photo detectors 34 and 35. The optical isolator 36 is optically connected to the optical port P1 of the optical coupler 31a. The optical isolator 36 is mounted so as to transmit light to be input into the optical port P1 and block light output from the optical port P1. The optical isolator 37 is optically connected to the optical port P4 of the optical coupler 32a. The optical isolator 37 is mounted so as to transmit light to be input into the optical port P4 and block light output from the optical port P4.

With the above configuration, the wavelength component of the WDM signal 1 passing through the tunable filter 33, which is output from the optical port P4, is blocked by the optical isolator 37. Similarly, the wavelength component of the WDM signal 2 passing through the tunable filter 33, which is output from the optical port P1, is blocked by the optical isolator 36. Accordingly, unnecessary optical signal components have no effect on the circuits optically connected to the optical ports P1 and P4.

Figure 8:
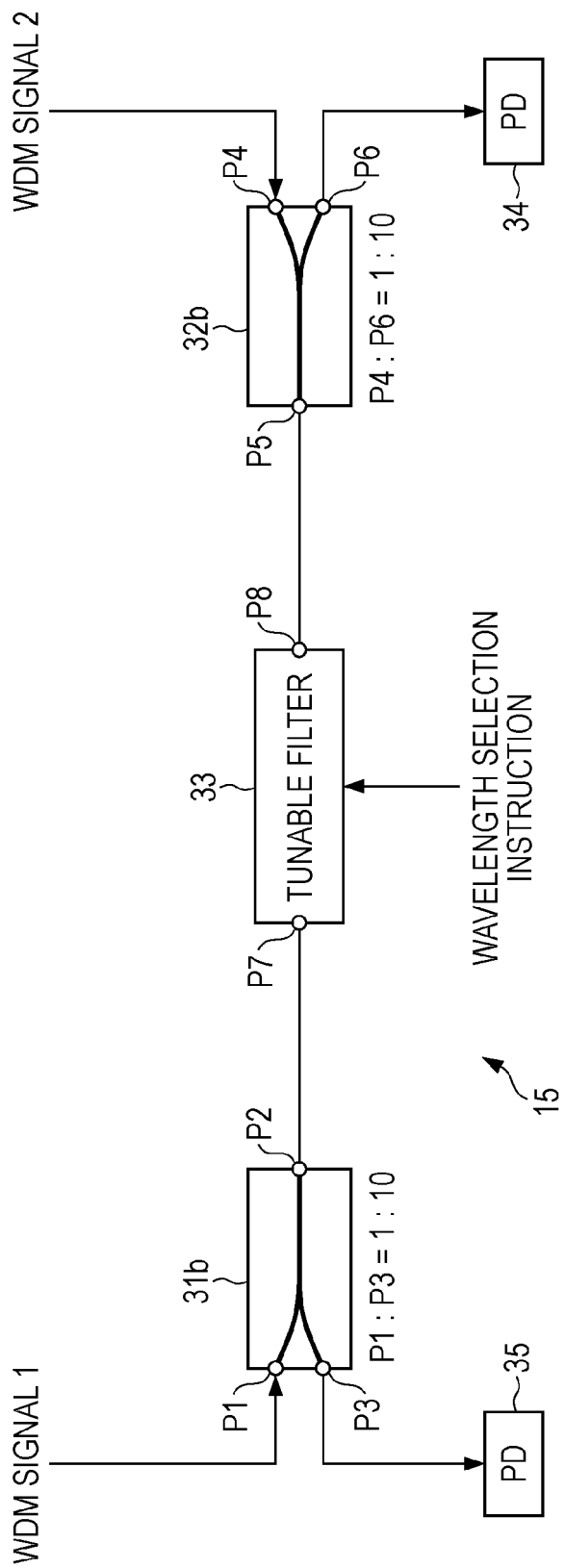
FIG. 8 illustrates a third example of the optical channel monitor.

In the example illustrated in FIG. 8, an optical coupler 31b is used as the first optical device 31 and an optical coupler 32b is used as the second optical device 32. The optical coupler 31b is configured so that the split ratio of the optical port P3 is higher than the split ratio of the optical port P1. In other words, the optical coupler 31b splits the light input through the optical port P2 so that the output power from the optical port P3 is higher than the output power from the optical port P1. Similarly, the optical coupler 32b is configured so that the split ratio of the optical port P6 is higher than the split ratio of the optical port P4. In other words, the optical coupler 32b splits the light input through the optical port P5 so that the output power from the optical port P6 is higher than the output power from the optical port P4.

With the above configuration, most of the wavelength component of the WDM signal 1 passing through the tunable filter 33 is led to the photo detector 34 through the optical port P6 by the optical coupler 32b. At this time, although part of the wavelength component of the WDM signal 1 passing through the tunable filter 33 is output from the optical port P4, the power of the light output from the optical port P4 is sufficiently low. Similarly, most of the wavelength component of the WDM signal 2 passing through the tunable filter 33 is led to the photo detector 35 through the optical port P3 by the optical coupler 31b. At this time, although part of the wavelength component of the WDM signal 2 passing through the tunable filter 33 is output from the optical port P1, the power of the light output from the optical port P1 is sufficiently low.

As described above, unnecessary optical signal components output from the optical ports P1 and P4 are suppressed in the example illustrated in FIG. 8. The split ratio of each of the optical couplers 31b and 32b is, for example, 10:1. However, the split ratio of each of the optical couplers 31b and 32b is not limited to 10:1.

Figure 9:
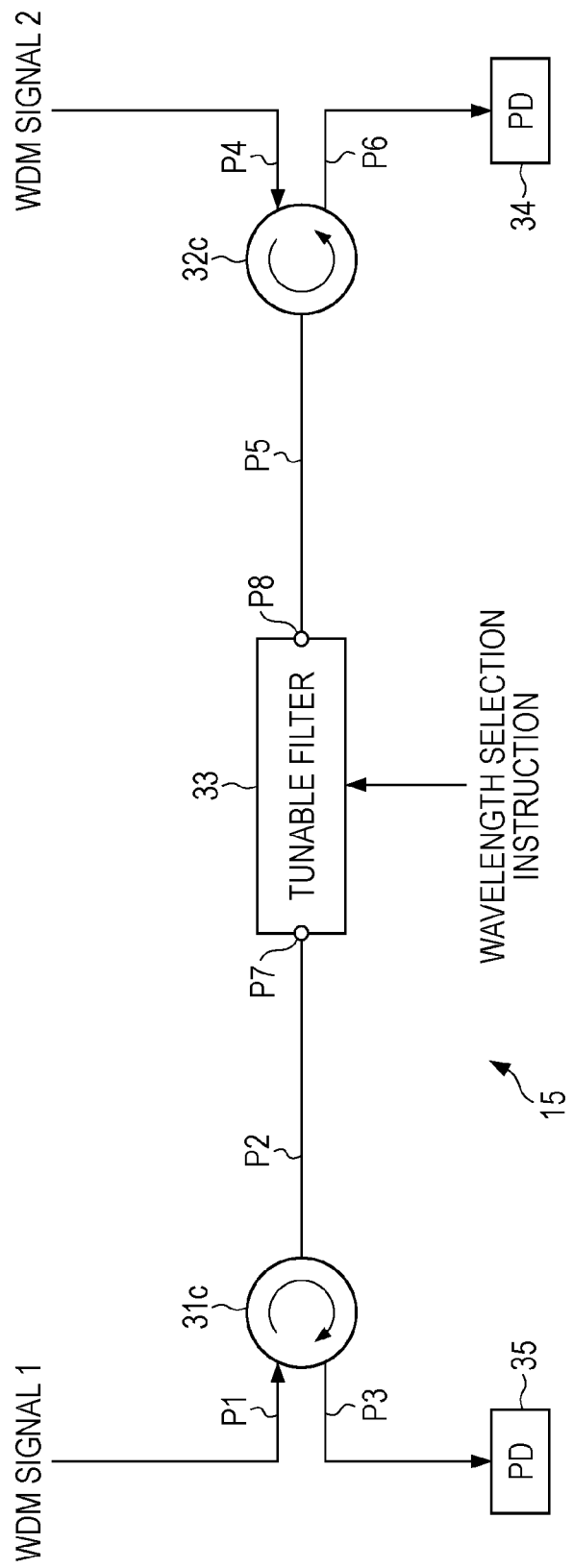
FIG. 9 illustrates a fourth example of the optical channel monitor.

In the example illustrated in FIG. 9, the first optical device 31 and the second optical device 32 are each realized by an optical circulator. Specifically, an optical circulator 31c is an example of the first optical device 31 and an optical circulator 32c is an example of the second optical device 32.

The optical circulator 31c leads light input through the optical port P1 to the optical port P2 and light input through the optical port P2 to the optical port P3. Light input through the optical port P2 is not led to the optical port P1. Similarly, the optical circulator 32c leads light input through the optical port P4 to the optical port P5 and light input through the optical port P5 to the optical port P6. Light input through the optical port P5 is not led to the optical port P4.

With the above configuration, the wavelength component of the WDM signal 1 passing through the tunable filter 33 is led to the photo detector 34 by the optical circulator 32c. The wavelength component of the WDM signal 1 passing through the tunable filter 33 is not led to the optical port P4. Similarly, the wavelength component of the WDM signal 2 passing through the tunable filter 33 is led to the photo detector 35 by the optical circulator 31c. The wavelength component of the WDM signal 2 passing through the tunable filter 33 is not led to the optical port P1. Accordingly, unnecessary optical signal components have no effect on the circuits optically connected to the optical ports P1 and P4.

Figure 10:
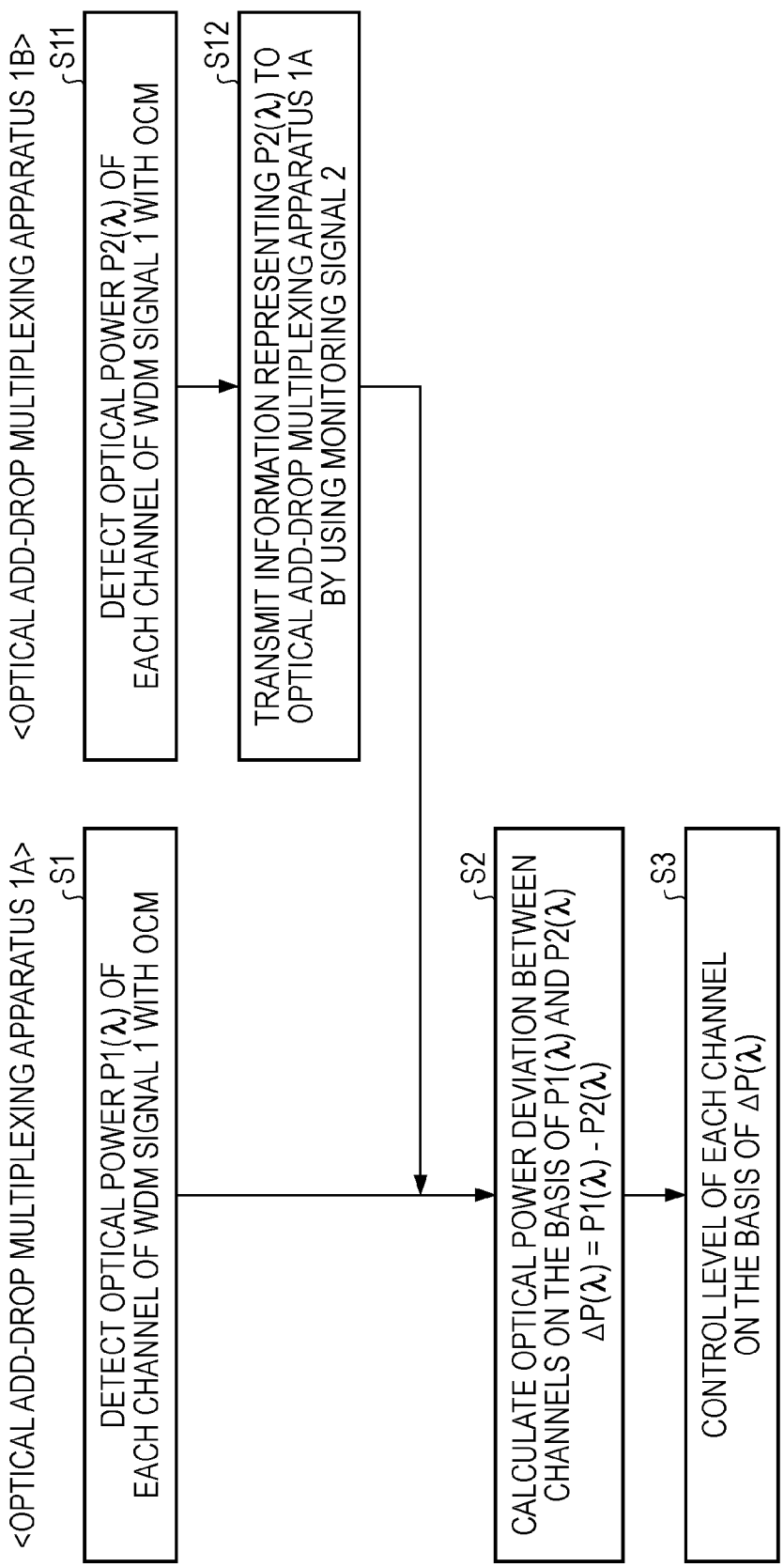
FIG. 10 is a flowchart illustrating an exemplary method of controlling the WDM signal by using a result of monitoring by the optical channel monitor.

FIG. 10 is a flowchart illustrating an exemplary method of controlling the WDM signal by using the result of monitoring by the optical channel monitor. A process of controlling the power of each channel of the WDM signal 1, performed by the optical add-drop multiplexing apparatus 1A illustrated in FIG. 3, will now be described. The optical add-drop multiplexing apparatus 1A uses the result of monitoring of the WDM signal 1 by the optical add-drop multiplexing apparatus 1B to control the WDM signal 1. Accordingly, the operations of the optical add-drop multiplexing apparatuses 1A and 1B are illustrated in the flowchart illustrated in FIG. 10.

Referring to FIG. 10, in S1, the optical channel monitor 15 in the optical add-drop multiplexing apparatus 1A detects optical power $P1(\lambda)$ of each channel of the WDM signal 1 output from the OADM device 11. The WDM signal 1 output from the OADM device 11 is split by the optical beam splitter 12 and is led to the optical channel monitor 15. For example, when the WDM signal 1 is led to the optical port P1 of the optical channel monitor 15 illustrated in FIG. 4, the optical power $P1(\lambda)$ of each channel of the WDM signal 1 is detected by the photo detector 34 (or the channel detector 44). Transmission power information representing the optical power $P1(\lambda)$ detected by the optical channel monitor 15 is supplied to the controller 16.

In S11, the optical channel monitor 15 in the optical add-drop multiplexing apparatus 1B detects optical power $P2(\lambda)$ of each channel of the WDM signal 1 received from the optical add-drop multiplexing apparatus 1A. In the optical add-drop multiplexing apparatus 1B, the WDM signal 1 is amplified by the optical amplifier 18, the WDM signal 1 that is amplified is split by the optical beam splitter 19, and the WDM signal 1 that is split is led to the optical channel monitor 15.

In S12, the monitoring signal transmitter 20 in the optical add-drop multiplexing apparatus 1B generates the monitoring signal 2 including reception power information representing the optical power $P2(\lambda)$ detected by the optical channel monitor 15. The monitoring signal transmitter 20 transmits the monitoring signal 2 to the optical add-drop multiplexing apparatus 1A. The monitoring signal 2 is transmitted to the optical add-drop multiplexing apparatus 1A through the optical transmission line 120B, along with the WDM signal 2.

The monitoring signal receiver 21 in the optical add-drop multiplexing apparatus 1A receives the monitoring signal 2 transmitted from the optical add-drop multiplexing apparatus 1B. The monitoring signal receiver 21 supplies the received monitoring signal 2 to the controller 16. In other words, the reception power information representing the optical power $P2(\lambda)$ detected by the optical add-drop multiplexing apparatus 1B is supplied to the controller 16.

In S2, the controller 16 in the optical add-drop multiplexing apparatus 1A calculates optical power deviation $\Delta P(\lambda)$ on the basis of the optical power $P1(\lambda)$ detected by the optical channel monitor 15 in the optical add-drop multiplexing apparatus 1A and the optical power $P2(\lambda)$ detected by the optical channel monitor 15 in the optical add-drop multiplexing apparatus 1B. Here, the controller 16 calculates the optical power deviation $\Delta P(\lambda)$ for each channel of the WDM signal 1.

$$\Delta P(\lambda) \text{ [dB]} = P1(\lambda) \text{ [dBm]} - P2(\lambda) \text{ [dBm]}$$

The optical power deviation $\Delta P(\lambda)$ occurs in the transmission from the optical add-drop multiplexing apparatus 1A to the optical add-drop multiplexing apparatus 1B. In other words, the optical power deviation $\Delta P(\lambda)$ is affected by the optical amplifier 13 in the optical add-drop multiplexing apparatus 1A, the optical transmission line 120A, and the optical amplifier 18 in the optical add-drop multiplexing apparatus 1B. For example, gain deviation may occur in the optical amplifiers 13 and 18. The optical transmission line has a wavelength dependent loss (WDL). In addition, a stimulated Raman scattering (SRS) tilt may occur on the optical transmission line.

In S3, the controller 16 in the optical add-drop multiplexing apparatus 1A generates a control signal for controlling the optical power of each channel of the WDM signal 1 on the basis of the optical power deviation $\Delta P(\lambda)$. The OADM device 11 controls the power of each channel of the WDM signal 1 in accordance with the control signal. Here, the controller 16 controls the OADM device 11, for example, so that the respective channels of the WDM signal 1 have the same optical power or substantially the same optical power in the optical add-drop multiplexing apparatus 1B. It is assumed that the OADM device 11 has a function to control the levels of the individual channels of the WDM signal. In this case, for example, the OADM device 11 controls the amounts of attenuation of the individual channels of the WDM signal.

The flowchart in FIG. 10 illustrates the method of controlling the WDM signal 1 to be transmitted from the optical add-drop multiplexing apparatus 1A to the optical add-drop multiplexing apparatus 1B. A method of controlling the WDM signal 2 to be transmitted from the optical add-drop multiplexing apparatus 1B to the optical add-drop multiplexing apparatus 1A is substantially the same as the method illustrated in FIG. 10. However, the control of the WDM signal 2 is performed by the controller 16 in the optical add-drop multiplexing apparatus 1B. The controller 16 in the optical add-drop multiplexing apparatus 1B uses the transmission power information about the WDM signal 2 detected by the optical channel monitor 15 in the optical add-drop multiplexing apparatus 1B and the reception power information about the WDM signal 2 detected by the optical channel monitor 15 in the optical add-drop multiplexing apparatus 1A to control the power of each channel of the WDM signal 2.

The optical channel monitor 15 monitors each channel of the WDM signal 1 in the flowchart illustrated in FIG. 10. However, the optical channel monitor 15 monitors each channel of the WDM signal 1 and each channel of the WDM signal 2. For example, in S1 in the flowchart illustrated in FIG. 10, the optical channel monitor 15 in the optical add-drop multiplexing apparatus 1A detects the optical power of each channel of the WDM signal 1. The optical channel monitor 15 also detects the optical power of each channel of the WDM signal 2 received from the optical add-drop multiplexing apparatus 1B, although not illustrated in FIG. 10. The optical add-drop multiplexing apparatus 1A notifies the optical add-drop multiplexing apparatus 1B of information representing the optical power of each channel of the WDM signal 2 by using the monitoring signal 1.

In S11 in the flowchart illustrated in FIG. 10, the optical channel monitor 15 in the optical add-drop multiplexing apparatus 1B detects the optical power of each channel of the WDM signal 1 received from the optical add-drop multiplexing apparatus 1A. The optical channel monitor 15 also detects the optical power of each channel of the WDM signal 2 to be transmitted to the optical add-drop multiplexing apparatus 1A, although not illustrated in FIG. 10.

As described above, in the optical add-drop multiplexing apparatus 1 illustrated in FIG. 3, one optical channel monitor 15 monitors the two WDM signals. For example, in the optical add-drop multiplexing apparatus 1A, the optical channel monitor 15 monitors the WDM signal 1 to be transmitted to the optical add-drop multiplexing apparatus 1B and the WDM signal 2 received from the optical add-drop multiplexing apparatus 1B. In contrast, in the optical add-drop multiplexing apparatus 100 illustrated in FIG. 1, the WDM signal to be transmitted to the optical add-drop multiplexing apparatus 100B is monitored by the optical channel monitor 105 and the WDM signal received from the optical add-drop multiplexing apparatus 100B is monitored by the optical channel monitor 110.

Accordingly, with the configurations according to the embodiment, it is possible to reduce the number of the optical channel monitors mounted in the optical add-drop multiplexing apparatus. In other words, the adoption of the optical channel monitor 15 of the embodiment allows the cost of the optical transmission apparatus (the optical add-drop multiplexing apparatus 1 here) having the function to monitor multiple WDM signals to be reduced.

A switch to select one WDM signal from multiple WDM signals may be provided at the input side of the optical channel monitor illustrated in FIG. 2. In this case, it is possible to monitor the multiple WDM signals with one optical channel monitor. However, since it is not possible to simultaneously monitor the multiple WDM signals with this configuration, it takes a long time to monitor the WDM signals. In contrast, with the configuration according to the embodiment, since it is possible to simultaneously monitor the two WDM signals, it takes a short time to monitor the WDM signals.

Figure 11:
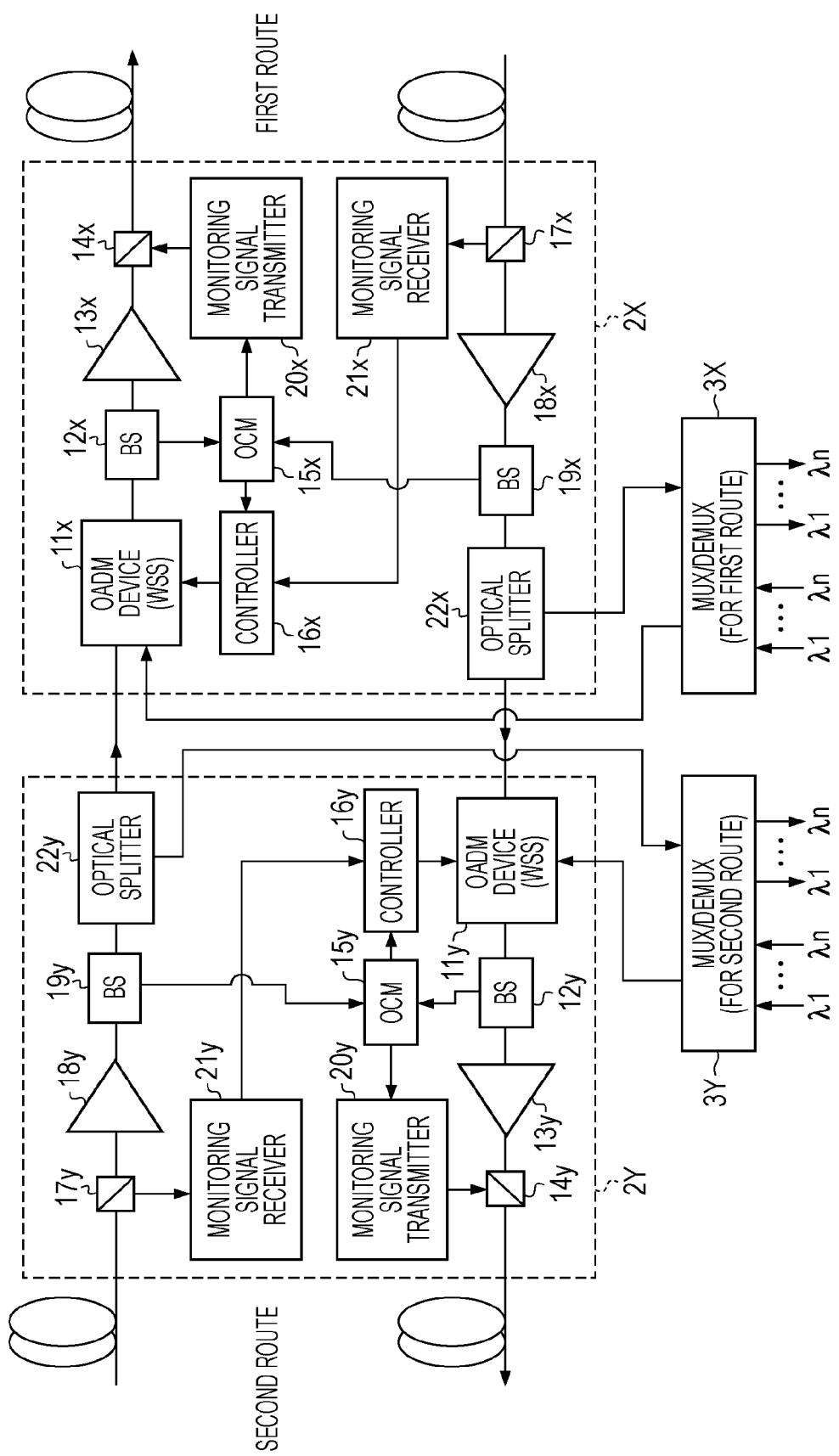
FIG. 11 illustrates an embodiment of the configuration of an optical add-drop multiplexing apparatus including the optical channel monitors according to the embodiment.

FIG. 11 illustrates an embodiment of the configuration of an optical add-drop multiplexing apparatus including the optical channel monitors according to the embodiment. The optical add-drop multiplexing apparatus illustrated in FIG. 11 has a first route and a second route. The "route" means an optical transmission line that extends in a certain direction in this specification. Each route includes an incoming route and an outgoing route. The number of the routes in the optical add-drop multiplexing apparatus may be represented by a unit of "degree." For example, the optical add-drop multiplexing apparatus illustrated in FIG. 11 is a two-degree OADM apparatus.

The optical add-drop multiplexing apparatus illustrated in FIG. 11 includes OADM modules 2X and 2Y and multiplexing-demultiplexing modules (MUX/DEMUX) 3X and 3Y. The OADM modules 2X and 2Y are provided for the corresponding routes. In the embodiment illustrated in FIG. 11, the OADM module 2X is provided for the first route and the OADM module 2Y is provided for the second route.

An OADM device 11x, an optical beam splitter (BS) 12x, an optical amplifier 13x, an optical multiplexer 14x, an optical channel monitor (OCM) 15x, a controller 16x, an optical demultiplexer 17x, an optical amplifier 18x, an optical beam splitter (BS) 19x, a monitoring signal transmitter 20x, and a monitoring signal receiver 21x mounted in the OADM module 2X are substantially the same as the OADM device 11, the optical beam splitter (BS) 12, the optical amplifier 13, the optical multiplexer 14, the optical channel monitor (OCM) 15, the controller 16, the optical demultiplexer 17, the optical amplifier 18, the optical beam splitter (BS) 19, the monitoring signal transmitter 20, and the monitoring signal receiver 21, respectively, illustrated in FIG. 3. An OADM device 11y, an optical beam splitter (BS) 12y, an optical amplifier 13y, an optical multiplexer 14y, an optical channel monitor (OCM) 15y, a controller 16y, an optical demultiplexer 17y, an optical amplifier 18y, an optical beam splitter (BS) 19y, a monitoring signal transmitter 20y, and a monitoring signal receiver 21y mounted in the OADM module 2Y are substantially the same as the OADM device 11, the optical beam splitter (BS) 12, the optical amplifier 13, the optical multiplexer 14, the optical channel monitor (OCM) 15, the controller 16, the optical demultiplexer 17, the optical amplifier 18, the optical beam splitter (BS) 19, the monitoring signal transmitter 20, and the monitoring signal receiver 21, respectively, illustrated in FIG. 3.

However, the OADM module 2X leads a WDM signal received via the first route to the OADM module 2Y. Similarly, the OADM module 2Y leads a WDM signal received via the second route to the OADM module 2X.

The OADM module 2X outputs the WDM signal received via the second route to the first route. The OADM device 11x may insert an add signal generated by the multiplexing-demultiplexing module 3X into the WDM signal. The OADM device 11x may block one or more channels of the WDM signal. Similarly, the OADM module 2Y outputs the WDM signal received via the first route to the second route. The OADM device 11y may insert an add signal generated by the multiplexing-demultiplexing module 3Y into the WDM signal. The OADM device 11y may block one or more channels of the WDM signal.

An optical splitter 22x splits the WDM signal received via the first route. The WDM signal split by the optical splitter 22x is led to the OADM device 11y and the multiplexing-demultiplexing module 3X. Similarly, an optical splitter 22y splits the WDM signal received via the second route. The WDM signal split by the optical splitter 22y is led to the OADM device 11x and the multiplexing-demultiplexing module 3Y.

In the above configuration, the optical channel monitor 15x monitors the WDM signal to be transmitted to the first route and the WDM signal received via the first route. The optical channel monitor 15y monitors the WDM signal to be transmitted to the second route and the WDM signal received via the second route.

Figure 12:
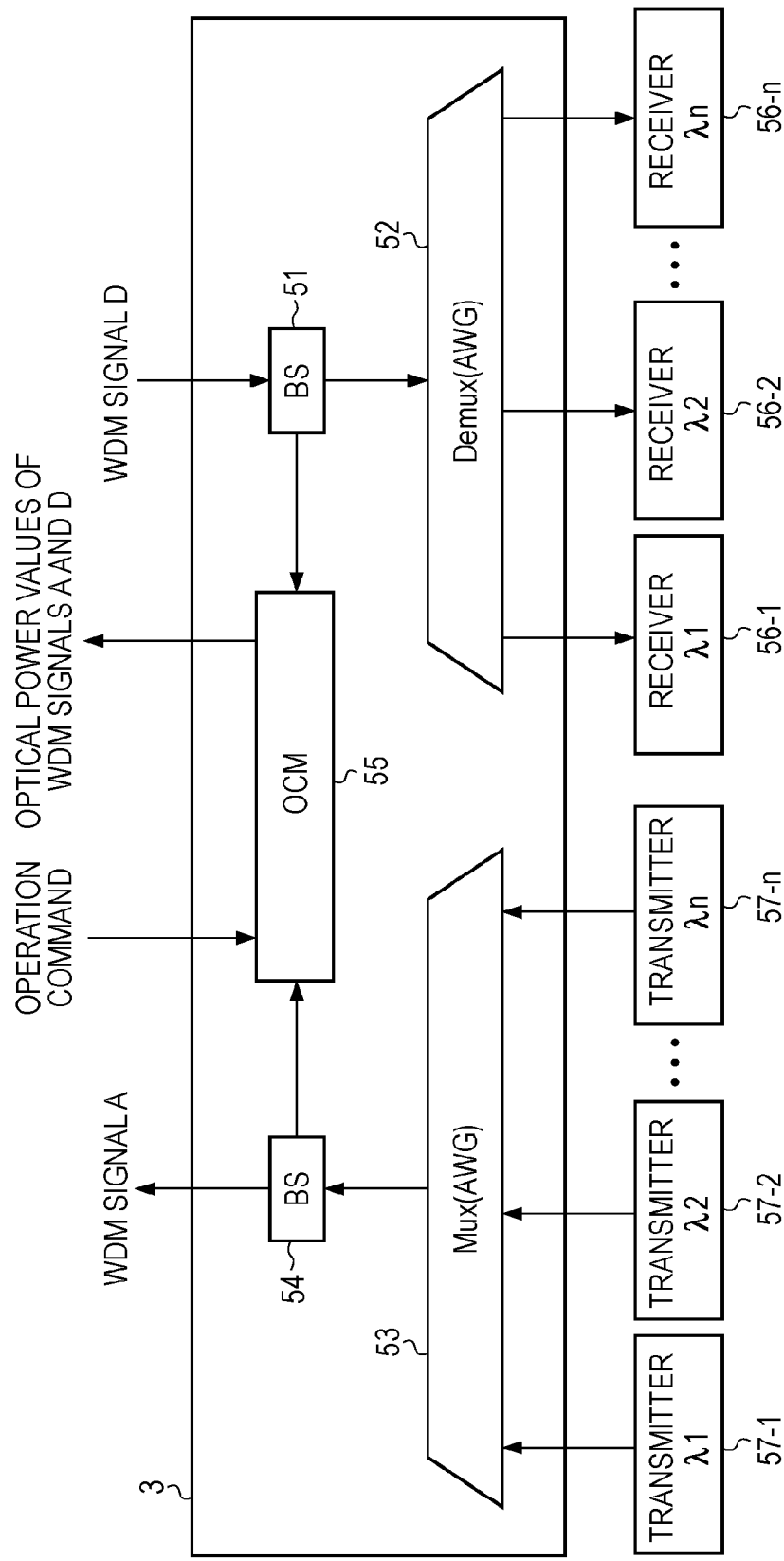
FIG. 12 illustrates an example of the configuration of a multiplexing-demultiplexing module.

FIG. 12 illustrates an example of the configuration of a multiplexing-demultiplexing module. A multiplexing-demultiplexing module 3 illustrated in FIG. 12 is an example of the multiplexing-demultiplexing modules 3X and 3Y illustrated in FIG. 11. When the multiplexing-demultiplexing module 3 operates as the multiplexing-demultiplexing module 3X illustrated in FIG. 11, a WDM signal A corresponds to an add signal to be led to the OADM device 11x and a WDM signal D corresponds to a drop signal received from the optical splitter 22x. When the multiplexing-demultiplexing module 3 operates as the multiplexing-demultiplexing module 3Y illustrated in FIG. 11, the WDM signal A corresponds to an add signal to be led to the OADM device 11y and the WDM signal D corresponds to a drop signal received from the optical splitter 22y.

The multiplexing-demultiplexing module 3 includes an optical beam splitter (BS) 51, a demultiplexer (Demux) 52, a multiplexer (Mux) 53, an optical beam splitter (BS) 54, and an optical channel monitor (OCM) 55. The WDM signal D that is input is led to the demultiplexer 52 through the optical beam splitter 51. The optical beam splitter 51 splits the WDM signal D to lead the WDM signal D to the optical channel monitor 55. The demultiplexer 52 demultiplexes the WDM signal D for every wavelength to lead the WDM signal D to receivers 56-1 to 56-n. The demultiplexer 52 is realized by, for example, an arrayed waveguide grating (AWG).

The multiplexer 53 multiplexes optical signals transmitted from transmitters 57-1 to 57-n to generate the WDM signal A. The multiplexer 53 is realized by, for example, an AWG. The optical beam splitter 54 splits the WDM signal A supplied from the multiplexer 53 to lead the WDM signal A to the optical channel monitor 55.

The optical channel monitor 55 is realized by the optical channel monitor according to the embodiment. Accordingly, the optical channel monitor 55 monitors each channel of the WDM signal D and monitors each channel of the WDM signal A upon reception of an operation command instructing start of the monitoring operation. Specifically, the optical channel monitor 55 monitors each channel of the WDM signal demultiplexed by the demultiplexer 52 and monitors each channel of the WDM signal multiplexed by the multiplexer 53.

Figure 13:
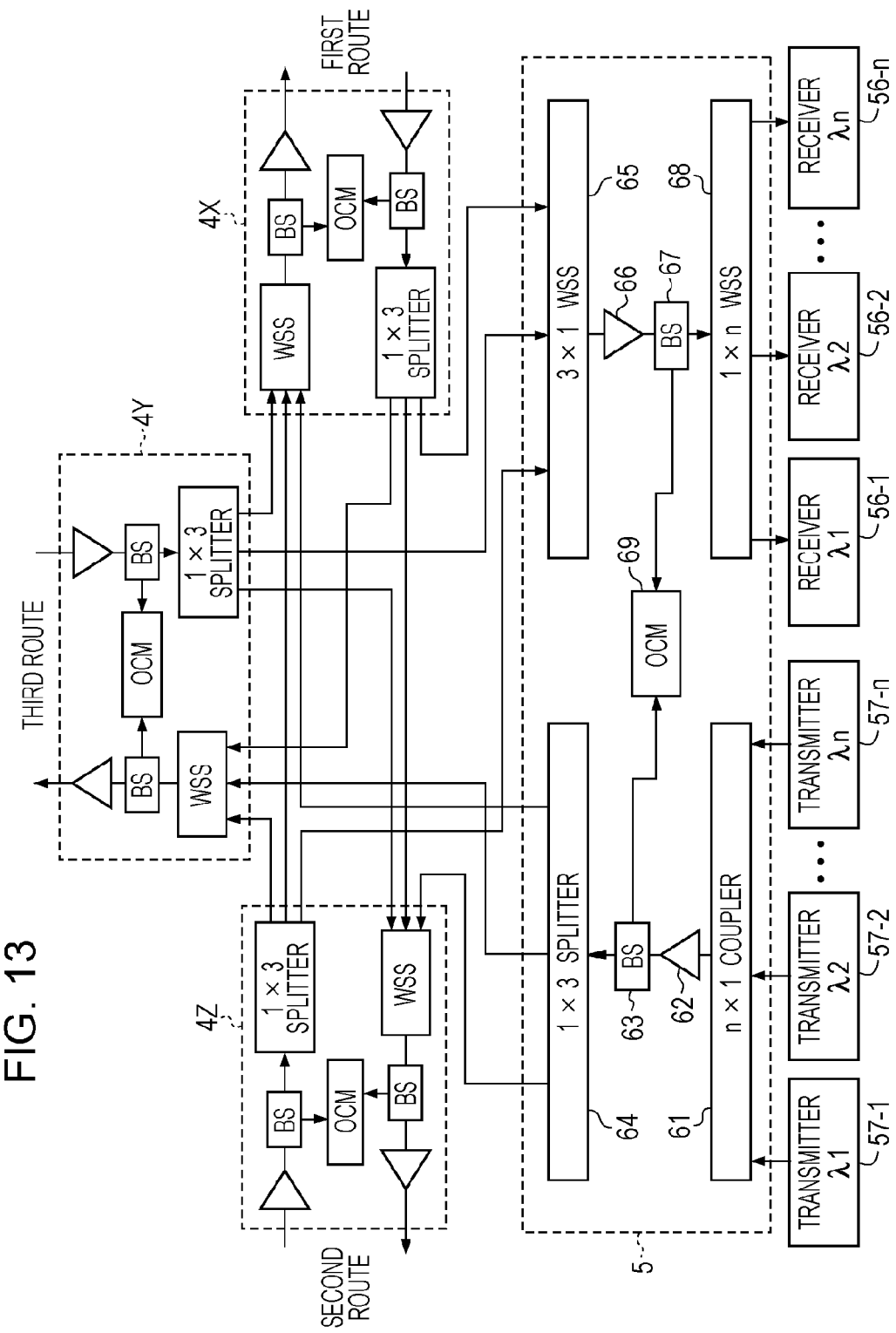
FIG. 13 illustrates another embodiment of the configuration of an optical add-drop multiplexing apparatus including the optical channel monitors according to the embodiment.

FIG. 13 illustrates another embodiment of the configuration of an optical add-drop multiplexing apparatus including the optical channel monitors according to the embodiment. The optical add-drop multiplexing apparatus illustrated in FIG. 13 has a first route, a second route, and a third route. In other words, the optical add-drop multiplexing apparatus is a three-degree OADM apparatus. The optical add-drop multiplexing apparatus includes OADM modules 4X, 4Y, and 4Z and a colorless-directionless module 5. The OADM modules 4X, 4Y, and 4Z are provided for the first route, the second route, and the third route, respectively.

Each of the OADM modules 4X, 4Y, and 4Z is substantially the same as the OADM modules 2X and 2Y illustrated in FIG. 11. However, some components in each of the OADM modules 4X, 4Y, and 4Z are omitted in FIG. 13 for simplicity. In the configuration illustrated in FIG. 13, 1x3 splitters are mounted, instead of the optical splitters 22x and 22y illustrated in FIG. 11.

The colorless-directionless module 5 includes an n×1 coupler 61, an optical amplifier 62, an optical beam splitter (BS) 63, a 1×3 splitter 64, a 3×1 wavelength selective switch (WSS) 65, an optical amplifier 66, an optical beam splitter (BS) 67, a 1×n wavelength selective switch (WSS) 68, and an optical channel monitor (OCN) 69.

The n×1 coupler 61 optically multiplexes optical signals λ1 to λn transmitted from the transmitters 57-1 to 57-n to generate a WDM signal. The optical signals λ1 to λn have different wavelengths. The optical signals λ1 to λn may be input into arbitrary ports of the n×1 coupler 61. In other words, a colorless function is realized.

The WDM signal output from the n×1 coupler 61 is amplified by the optical amplifier 62 and is led to the 1×3 splitter 64 and the optical channel monitor 69 by the optical beam splitter 63. The 1×3 splitter 64 leads the WDM signal to the wavelength selective switch (WSS) in each of the OADM modules 4X, 4Y, and 4Z. The WSS in each of the OADM modules 4X, 4Y, and 4Z selects a desired optical signal from the optical signals λ1 to λn. The optical add-drop multiplexing apparatus is capable of transmitting the optical signals λ1 to λn to desired routes. In other words, a directionless function is realized.

Each of the OADM modules 4X, 4Y, and 4Z leads the WDM signal received through the corresponding route to the other two OADM modules. The WSS in each of the OADM modules 4X, 4Y, and 4Z selects a desired wavelength in the WDM signals led from the other OADM modules.

Each of the OADM modules 4X, 4Y, and 4Z leads the WDM signal received through the corresponding route also to the colorless-directionless module 5. In other words, the WDM signals through the respective routes are led to the 3×1 wavelength selective switch 65. The 3×1 wavelength selective switch 65 selects a desired wavelength from each WDM signal. The directionless function is realized in the above manner.

The WDM signal output from the 3×1 wavelength selective switch 65 is amplified by the optical amplifier 66 and is led to the 1×n wavelength selective switch 68 and the optical channel monitor 69 by the optical beam splitter 67. The 1×n wavelength selective switch 68 selects an optical signal of a desired wavelength from the WDM signal that is input. The 1×n wavelength selective switch 68 outputs the selected optical signal through an arbitrary port. In other words, the colorless function is realized.

The optical channel monitor 69 is the optical channel monitor according to the embodiment. The optical channel monitor 69 monitors the WDM signal output from the n×1 coupler 61 and the WDM signal output from the 3×1 wavelength selective switch 65. The optical channel monitor 69 detects the presence of the optical signal and the optical power for each channel of each WDM signal. The optical channel monitor provided in each of the OADM modules 4X, 4Y, and 4Z is also realized by the optical channel monitor according to the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical channel monitor comprising:
   a first optical device configured to include a first optical port, a second optical port, and a third optical port, light input through the first optical port being led to the second optical port, light input through the second optical port being led at least to the third optical port;
   a second optical device configured to include a fourth optical port, a fifth optical port, and a sixth optical port, light input through the fourth optical port being led to the fifth optical port, light input through the fifth optical port being led at least to the sixth optical port;
   an optical filter configured to include a seventh optical port optically connected to the second optical port of the first optical device and an eighth optical port optically connected to the fifth optical port of the second optical device, a specified wavelength being transmitted between the seventh optical port and the eighth optical port;
   a first photo detector configured to detect light output from the sixth optical port of the second optical device; and
   a second photo detector configured to detect light output from the third optical port of the first optical device.

2. The optical channel monitor according to claim 1, wherein the first optical device is an optical coupler that leads light input through the second optical port to the first optical port and the third optical port, and
   wherein the second optical device is an optical coupler that leads light input through the fifth optical port to the fourth optical port and the sixth optical port.

3. The optical channel monitor according to claim 2, further comprising:
   a first optical isolator configured to transmit light to be input into the first optical port and block light output from the first optical port; and
   a second optical isolator configured to transmit light to be input into the fourth optical port and block light output from the fourth optical port.

4. The optical channel monitor according to claim 1,
   wherein the first optical device splits light input through the second optical port so that power of light output from the third optical port is higher than power of light output from the first optical port, and
   wherein the second optical device splits light input through the fifth optical port so that power of light output from the sixth optical port is higher than power of light output from the fourth optical port.

5. The optical channel monitor according to claim 1,
   wherein the first optical device is an optical circulator that leads light input through the first optical port to the second optical port and leads light input through the second optical port to the third optical port, and
   wherein the second optical device is an optical circulator that leads light input through the fourth optical port to the fifth optical port and leads light input through the fifth optical port to the sixth optical port.

6. The optical channel monitor according to claim 1, further comprising:
a wavelength sweeper configured to sweep a wavelength to be transmitted into the optical filter.

7. The optical channel monitor according to claim 6, further comprising:
a first detector configured to detect each power of a plurality of channels of a first WDM signal input through the first optical port of the first optical device, based on a signal output from the first photo detector; and
a second detector configured to detect each power of a plurality of channels of a second WDM signal input through the fourth optical port of the second optical device, based on a signal output from the second photo detector.

8. An optical transmission apparatus that transmits a first WDM signal and receives a second WDM signal, the optical transmission apparatus comprising:
an optical channel monitor including:
a first optical device configured to include a first optical port, a second optical port, and a third optical port, light input through the first optical port being led to the second optical port, light input through the second optical port being led at least to the third optical port;
a second optical device configured to include a fourth optical port, a fifth optical port, and a sixth optical port, light input through the fourth optical port being led to the fifth optical port, light input through the fifth optical port being led at least to the sixth optical port;
an optical filter configured to include a seventh optical port optically connected to the second optical port of the first optical device and an eighth optical port optically connected to the fifth optical port of the second optical device, a specified wavelength being transmitted between the seventh optical port and the eighth optical port;
a first photo detector configured to detect light output from the sixth optical port of the second optical device; and
a second photo detector configured to detect light output from the third optical port of the first optical device,
wherein the first WDM signal to be transmitted is led to the first optical port of the first optical device, and
wherein the received second WDM signal is led to the fourth optical port of the second optical device.

* * * * *